United States Patent [19]
Ryan

[11] Patent Number: 5,315,448
[45] Date of Patent: May 24, 1994

[54] COPY PROTECTION FOR HYBRID DIGITAL VIDEO TAPE RECORDING AND UNPROTECTED SOURCE MATERIAL

[75] Inventor: John O. Ryan, Cupertino, Calif.

[73] Assignee: Macrovision Corporation, Mountain View, Calif.

[21] Appl. No.: 32,894

[22] Filed: Mar. 18, 1993

[51] Int. Cl.$^5$ .................. H04N 5/78; C11B 15/04; H04L 9/00
[52] U.S. Cl. .................. 360/60; 360/37.1; 380/5
[58] Field of Search .................. 360/15, 27, 37.1, 60; 380/4, 5; 369/47

[56] References Cited

U.S. PATENT DOCUMENTS

| | | | |
|---|---|---|---|
| 4,631,603 | 12/1986 | Ryan | 360/60 |
| 4,907,093 | 3/1990 | Ryan | 358/335 |
| 4,914,694 | 4/1990 | Leonard et al. | 380/5 |
| 5,130,864 | 6/1992 | Shimada | 360/60 |
| 5,134,496 | 7/1992 | Schwab et al. | 358/335 |
| 5,144,658 | 9/1992 | Takahashi | 380/3 |
| 5,251,041 | 10/1993 | Young et al. | 360/37.1 |

Primary Examiner—Donald Hajec
Assistant Examiner—Thomas N. Forbus, Jr.
Attorney, Agent, or Firm—Skjerven, Morrill, MacPherson, Franklin & Friel

[57] ABSTRACT

A hybrid digital/analog video recorder prevents both analog and digital copying. The recorder (including a digital tape deck) inputs and outputs both analog and digital video signals. At the analog input, a detector detects conventional copy protection in the analog input video, and in response disables recording thereof. At the digital input, a first detector detects anti-copy bits present in the input material and in response prevents recording. A second bit detector detects serial copy prevention scheme bits, and in response adds an anti-copy bit to the input digital stream, preventing later copying of such material. When another bit detector detects anti-copy bits present in the playback digital data stream prior to conversion to analog, an analog copy protection signal modifies the output analog signal, inhibiting copying of the output signal. In another version, a specially adapted video recorder or playback device copy protects video source material which for technical reasons is not copy protectable. A copy protect "flag" is provided in a predetermined location in the video signal to be protected. The video recorder or playback device,, upon detection of the flag at playback, modifies the output standard (NTSC) video signal with a conventional copy protection process.

49 Claims, 2 Drawing Sheets

COPY PROTECTION FOR HYBRID DIGITAL VIDEO TAPE RECORDING AND UNPROTECTED SOURCE MATERIAL

BACKGROUND OF THE INVENTION

1. Field of the Invention

This disclosure is directed to a copy protection method and apparatus for use with (1) digital video recording, where it is desired to copy protect both an analog and digital video signal associated with a digital recording or playback apparatus and (2) any video material where the original source material is not copy protectable.

2. Description of the Prior Art

Various well known copy protection schemes for video signals include that disclosed in U.S. Pat. No. 4,631,603, John O. Ryan, Dec. 23, 1986 and assigned to Macrovision, incorporated by reference, directed to modifying an analog video signal to inhibit making of acceptable video recordings therefrom. This discloses adding a plurality of pulse pairs to the otherwise unused lines of a video signal vertical blanking interval, each pulse pair being a negative-going pulse followed closely by a positive-going pulse. The effect is to confuse AGC (automatic gain control circuitry) of a VCR (video cassette recorder) recording such a signal, so that the recorded signal is unviewable due to the presence of an excessively dark picture when the recorded signal is played back.

Another analog video protection scheme is disclosed in U.S. Pat. No. 4,914,694 issued Apr. 3, 1990, to Leonard, and assigned to Eidak Corp., incorporated by reference. The Eidak system (see Abstract) increases or decreases the length of each video field from the standard length, either by changing the time duration of the respective horizontal line intervals in each field while keeping a constant, standard number of lines per frame, or by changing the number of horizontal line intervals which constitute a frame while maintaining the standard duration of each line interval.

These video protection systems modify the video signal to be recorded (for instance on tape) or to be broadcast (for instance protected pay-per-view television programs) to make copying by ordinary VCRs difficult or impossible. When a video tape on which is recorded the copy protected video signal is played back for viewing using a VCR, the copy protection process is essentially transparent, i.e., it does not interfere with viewing. However, any attempt made to copy the video signal from the tape using a second VCR to record the output of the first (playback) VCR yields a picture degraded to some extent, depending on the efficacy of the particular copy protection system. These present video copy protection systems protect only analog video signals, which are the type of video signals broadcast and recorded using current consumer video technology.

Also well known are digital video tape recorders, although currently such digital video tape recorders (which both record and play back digitally) are available only for the professional market, due to their high cost. Such digital systems trade distortion-free performance for substantially higher bandwidth, i.e. substantially more information must be recorded per video frame. The advantage to the user of a digital recorder is that so long as the signals are recorded and played back in the digital domain, each successive generation of copies is without any significant reduction in picture quality, unlike the case with conventional analog recording technology. Current digital video recorders (not intended for consumer purposes) use the so-called "D-1", "D-2" or "D-3" video recording standards and require special video tape.

Future of Digital Recording

It is widely believed that digital video tape recorders will soon be commercially available for consumer use. To maintain compatibility with analog video broadcast signals and analog video tape recorders, it is likely that at least the first generation of consumer digital video tape recorders will be "hybrid" digital and analog systems. Such systems will have the capabilities of current analog video cassette recorders to record and playback analog signals, while still having equivalent digital capabilities. Thus these new hybrid digital tape recorders will have the capability internally to convert input analog signals into digital signals, and record the digital signals as a digital data stream on the tape. During playback the digital data stream from the tape will be available both as a digital signal for display by a digital television set (also not currently available) or be reconverted within the hybrid video tape recorder to a conventional analog video signal (such as the NTSC signal used in the United States.) The capability of the system internally to convert the received analog signals to a digital data stream will be important because currently there are no sources (either tape or broadcast) of digital video program material available to consumers.

Such hybrid video recorders will likely employ a "consumer" digital recording format differing from the standards of present professional digital systems. This consumer digital video format is not yet established. Such digital video recorders will likely include a conventional "front end" RF tuner and also an RF modulator on the output side, as do present conventional analog VCRs. (By analog video here is meant NTSC, PAL or SECAM.) The digital recording standard for consumers is likely to be essentially a data structure that represents the video signal as a stream of (binary) data bits along with suitable error concealment encoding, together with a physical tape standard.

Problems Posed by Digital Recording

Since digital video tape recorders will be capable of high fidelity reproduction which in turn will encourage copying, it is important that such recorders for consumer use be designed to inhibit or discourage unauthorized recording. For instance it is important to prevent use of recorders for illegally duplicating copyrighted video material, and also to prevent playing back of such illegally duplicated material. Currently available analog video copy protection techniques are not useful in the digital domain. Hence there is a need for a new copy protection system suitable for use with such hybrid digital and analog video tape recorders, where the material recorded on the tape is a digital data stream. A typical situation to be prevented is use of a hybrid video tape recorder to copy an output signal from a conventional VHS VCR, where the tape played back from the VHS VCR has a conventional copy protection process applied to it. The problem is to prevent the new hybrid digital-analog video tape recorder from copying the material from such a tape. Otherwise, the existence of such hybrid recorders would encourage copyright infringement.

SUMMARY OF THE INVENTION

A hybrid digital and analog tape recorder that records digitally provides copy protection in both the digital and analog domains. For externally supplied analog video, the recorder detects the presence of copy protection and in response disables recording. For externally supplied digital video, both anti-copy bits and serial copy protection bits are detected to respectively (1) disable recording and (2) prevent later copying by a second digital recorder. For playing back of recorded material, the presence of anti-copy bits is detected in the digital playback video, and the digital playback video upon being converted to an analog signal is modified by an analog video copy protection process.

In another embodiment, analog or digital source video material (either prerecorded or from an external source) is provided with a copy protection flag. Detection of the flag by a playback device results in modification of the played back standard video signal with an analog copy protection process. This embodiment is suitable for playback devices where the source video cannot be copy protected, but a standard (NTSC) video signal is provided of a played-back recording.

DETAILED DESCRIPTION OF THE INVENTION

Figure 1:
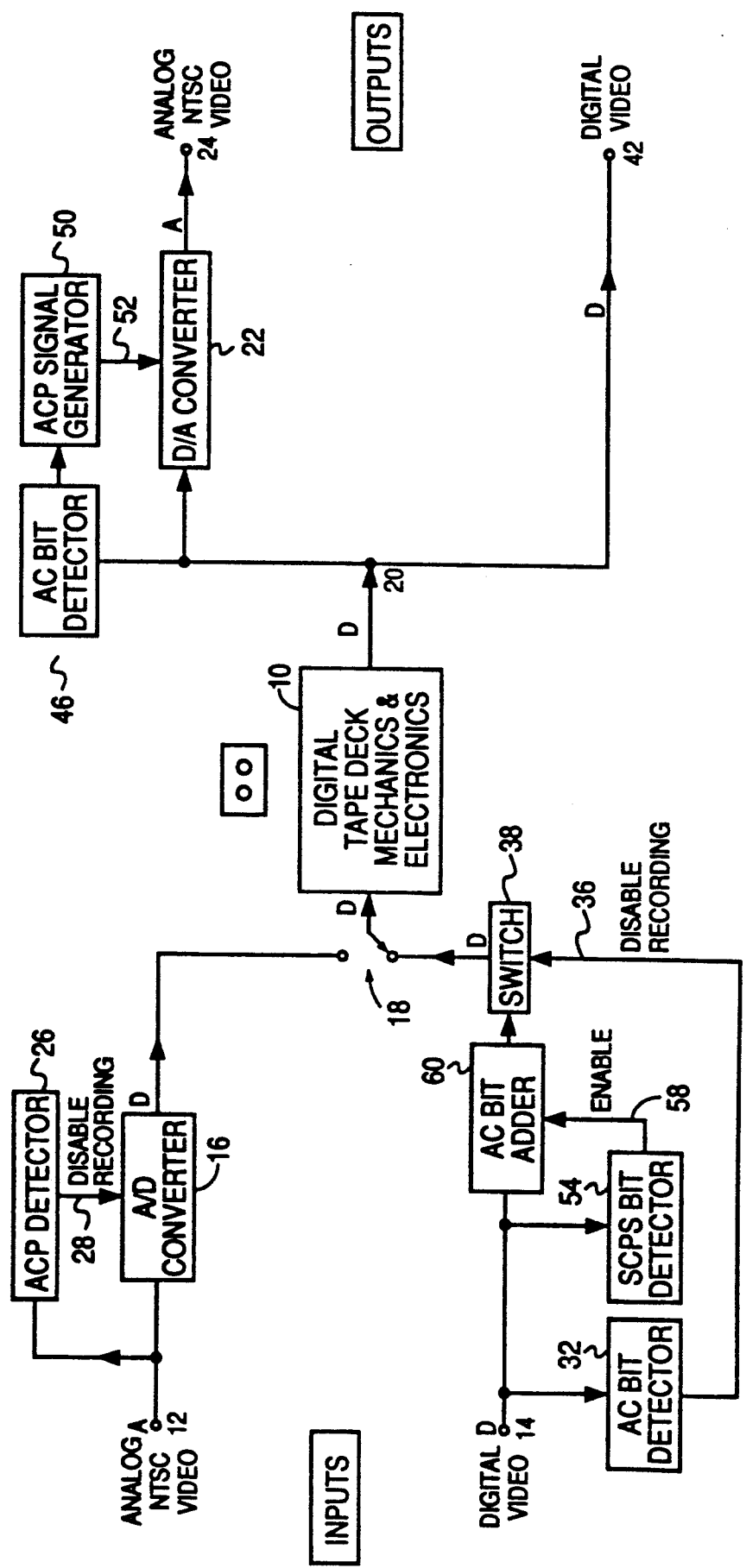
FIG. 1 is a block diagram of a hybrid digital video recorder in accordance with the present invention.

FIG. 1 shows a hybrid digital-analog video recorder in accordance with the present invention. Each block includes conventional elements currently commercially available or readily constructed by one of ordinary skill in the art in accordance with the following description. The one possible exception is the digital tape deck mechanics and electronics 10 which is the main subsystem of such a device. Presently available professional digital video recorders include such tape deck mechanics and electronics; however they are designed for recording and playback of material under current professional-type digital video standards. The digital tape deck 10 may be of the kind included in such present commercial professional systems. However, since it is envisioned that the hybrid system shown in FIG. 1 is chiefly (but not exclusively) intended for consumer use, such a system will likely include different digital tape deck mechanics and electronics, of a type suitable for large scale production at low cost and designed in accordance with consumer digital video format(s) not yet determined.

In any case, the recorder of FIG. 1 can be constructed of presently available components including a professional type digital tape deck as now commercially available from various companies. The tape to be played on tape deck 10 is in the form of (1) a video cassette or (2) reel-to-reel recording.

The recorder of FIG. 1 is a hybrid device capable of accepting at input terminal 12 a conventional analog video signal indicated by "A", which is an NTSC or other signal.

Also shown in FIG. 1 on the "inputs" side is digital video input terminal 14 for receiving digital video (indicated by "D") from an external source. Terminal 14 receives a broadcast digital video signal when in the future such signals are commercially broadcasted,, or from another digital video tape recorder or digital playback device.

Since the apparatus of FIG. 1 records a digital signal, the analog video signal at terminal 12 is converted to the desired digital format by analog to digital converter 16. Such analog to digital converters are well known in the video field, and the construction details of analog to digital converter 16 are determined by the nature of the digital recording format(s) compatible with digital tape deck 10.

The digital video data stream output from analog to digital converter 16 is provided (via switch 18) to digital tape deck 10. The person (or machine) operating the recorder of FIG. 1 decides whether at any one time he is recording an analog video input signal at terminal 12 or a digital video input signal at terminal 14. Switch 18 (either automatic or manually controlled) chooses from which terminal 12 or 14 the tape deck 10 receives the input signal to be recorded.

The input signal from switch 18 is then digitally recorded on tape (not shown) by tape deck 10. Subsequent playback of material recorded on the tape by tape deck 10 results in a digital signal "D" at output terminal 20 of tape deck 10. The digital signal at terminal 20 is then (if the ultimate output signal from the recorder is to be an analog signal) provided to digital to analog converter 22, which converts the digital signal D to the analog output signal A which is provided to analog output terminal 24. Digital to analog converter 22 (like its complementary converter 16) is conventional, the construction details being determined by the nature of the digital recording format and the analog output format. Analog output terminal 24 is connected (for instance) on the "outputs" side of the recorder to a conventional television set.

The recorder of FIG. 1 may conventionally be provided with an RF tuner (not shown) on the "inputs" side to extract video (NTSC or other) from an RF modulated video (TV) signal. Similarly on the "outputs" side an RF modulator (not shown) may be provided to convert the baseband (NTSC or other video signal at terminal 24 to an RF modulated video signal (TV), for provision to the antenna input terminal of a television set.

The copy protection portion of the apparatus of FIG. 1 (when operating in the analog domain) is explained with regard to the above-described analog chain including analog video input terminal 12, converter 16, switch 18, converter 22 and analog output terminal 24. It is assumed that the (NTSC) analog video received at terminal 12 may have been copy protected by one of the above-described copy protection processes, which typically add copy protection pulses to or otherwise modify particular portions of the video signal. The intention is that the recorder of FIG. 1 prevent copying of such material by means of designed-in circuitry, i.e. features built into the recorder by its manufacturer.

One system for adapting a video recorder to prevent copying of copy protected video is described in U.S. Pat. No. 4,907,093 issued Mar. 6, 1990 to John O. Ryan, assigned to Macrovision Corp. and incorporated by reference, the Abstract of which states:

A video signal is modified so that a television receiver will still provide a normal color picture which a video tape recorder will detect and prohibit its being recorded. A plurality of ordered pairs of pseudo-sync and positive pulses are added to the video signal vertical blanking interval following the normal sync pulse. A disabling circuit associated with a recorder detects the modified signal. This detection may be by comparing the voltage differential between the pseudo-sync pulse tip and the positive pulse relative to the normal voltage differential between the sync pulse tip and the back porch of the blanking interval. Alternatively, the modified signal can be detected by identifying the pulse frequency of the signal in the blanking interval. . . . Detection is also shown by peak-detecting the video signal and sampling this peak-detected signal during the vertical blanking. A control signal is produced, when the modified signal is present, which disables the recording device. If no modified signal is detected, the recording device is enabled.

The recorder of present FIG. 1 includes a similar approach to copy protection in its upper left portion, including ACP (anti-copy process) detector 26, which is similar to the detection circuitry described in various embodiments in U.S. Pat. No. 4,907,093, or alternatively is a detector for detecting the copy protection process of U.S. Pat. No. 4,914,694. ACP detector 26 could also detect serial types of copy protection processes. When an analog (NTSC) video signal is received at terminal 12, ACP detector 26 detects the presence of the copy protection, and upon detection thereof generates a disable recording control signal on line 28 which then disables (for instance) the analog to digital converter 16.

Disabling of converter 16 is somewhat different than the disabling method described in U.S. Pat. No. 4,907,093 (where no analog to digital converter is present), and instead in accordance with the present invention some other feature of the recorder is disabled. As described in U.S. Pat. No. 4,907,093, in the recorder of FIG. 1 an element other than the analog to digital converter 16 could be disabled by the disable recording signal on line 28. For instance digital tape deck 10 could be disabled, or an additional switch (not shown) in the signal path could be forced to its open position. Other means of disabling the recorder will be apparent to one of ordinary skill in the art. In any event, detection of a copy protection signal in the input analog video signal disables the recording of such signal. (ACP detector 26 herein corresponds to disabler 22 in FIG. 1 of the above-referenced patent.)

In terms of recording of copy protected material, in the alternative situation the input signal is a digital video signal provided on digital input video terminal 14. In this case, if the input signal is copy protected, typically such copy protection is provided by a tape duplicator facility that sets a predetermined anti-copy control bit in the digital data stream recorded on the tape. This anti-copy bit will be located for instance in a particular location of each video frame (such as a portion corresponding to the vertical blanking interval). Alternately such an anti-copy bit could be located in a predetermined location in each video line or in some other predetermined portion of the video signal; the exact location of this anti-copy bit is of no particular importance so long as it is determined by an accepted standard prior to manufacture of the recorder of FIG. 1. Therefore the recorder manufacturer designs anti-copy (AC) bit detector 32 to locate such an anti-copy bit by knowing its digital address.

Then, for instance, if anti-copy bit detector 32 detects that the anti-copy bit is set high, i.e. having a value of 1, this is interpreted as an instruction that the associated digital video material is not to be copied. Thereupon anti-copy bit detector 32 issues a disable recording control signal on line 36 which controls operation of switch 38. In this case, the disable recording signal on line 36 opens switch 38, preventing transmission of the digital video signal from terminal 14 to switch 18. Thus the anti-copy bit accomplishes its purpose of preventing copying of the associated video material input to the recorder on digital input terminal 14.

Alternatively, the user of the recorder of FIG. 1 may play back material from a prerecorded tape. In this case the problem is to prevent or inhibit subsequent unauthorized recording of the played back material. Such subsequent unauthorized recording is not a problem if the material played back from the tape on digital tape deck 10 is provided (in the digital domain) from output terminal 20 to digital video output terminal 42. This is because then the digital video output signal could only be recorded on another digital video recorder, which presumably also is equipped with the anti-copy bit detector 32 and associated disabling circuitry.

However, the hybrid recorder of FIG. 1 poses the additional copy protection problem of providing analog video output on terminal 24. The presence of an anti-copy bit in the digital data stream at terminal 20 would have no effect (having been stripped off or ignored in the digital to analog conversion) on an analog output signal at terminal 24. Therefore, an anti-copy (AC) bit detector 46 is provided in the analog output chain in the upper right portion of FIG. 1. AC bit detector 46 is similar to AC copy bit detector 32, operating in the digital domain to detect the anti-copy bit at its predetermined location. In response to the detection of the anti-copy bit by AC bit detector 46, an enabling signal is sent on line 52 to anti-copy process (ACP) signal generator 50.

Figure 2:
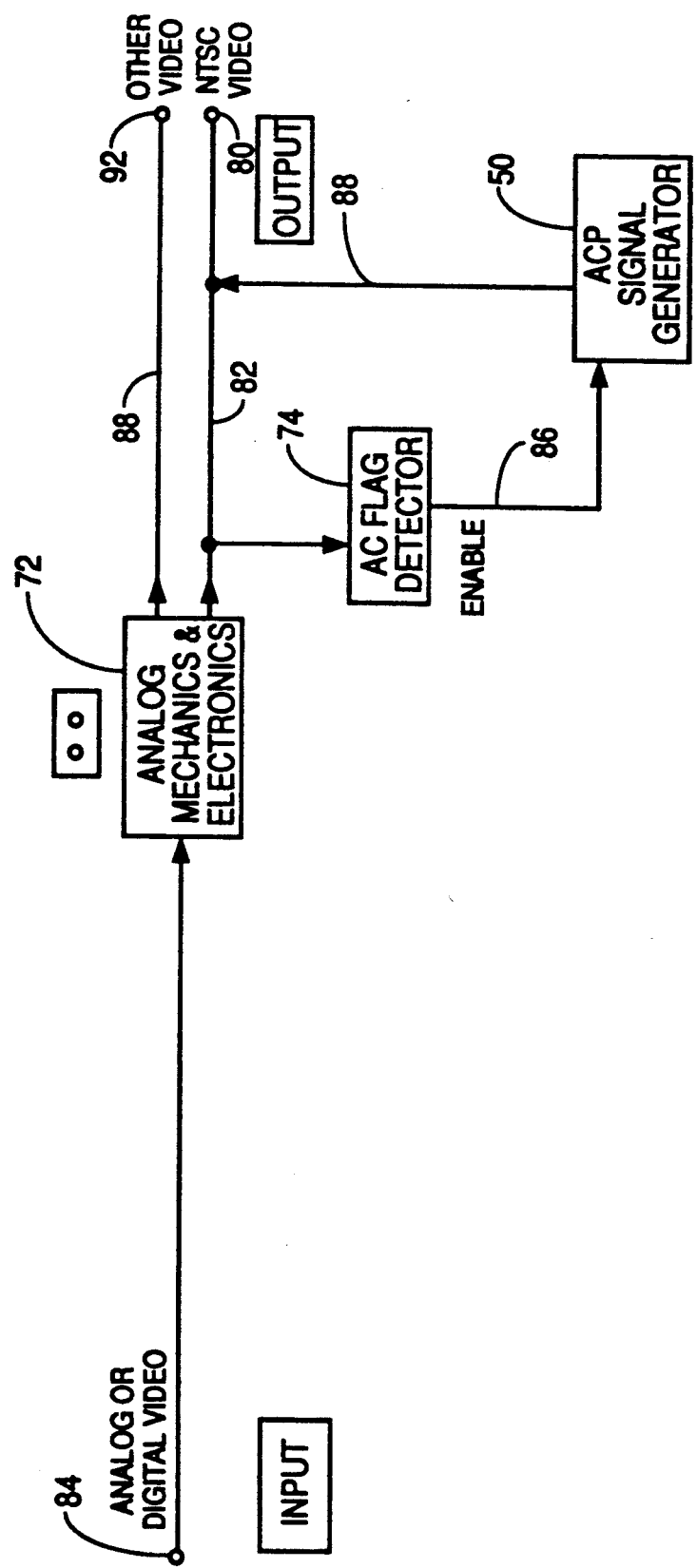
FIG. 2 is a block diagram of another video recorder or playback device in accordance with a second embodiment of the present invention.

ACP signal generator 50 is shown in one version in FIG. 2 of U.S. Pat. No. 4,631,603, and generates an analog video anti-copy signal. ACP signal generator 50 then adds this analog anti-copy signal to the output signal of digital to analog converter 22, which has converted the digital output signal from tape deck 10 to an analog (for example NTSC) signal. Alternatively, ACP signal generator 50 is as shown in above-referenced U.S. Pat. No. 4,914,694 in FIG. 1 for modifying the "TV signal source". Thus the analog (NTSC) video signal at output terminal 24 is an analog video signal modified by an analog anti-copy process. This prevents making of acceptable video recordings on existing analog VCRs from the signal provided from the prerecorded tape.

FIG. 1 also includes SCPS bit detector 54, line 581, and AC bit adder 60. In the field of digital audio tape recording, the serial copy management system (SCMS) is well known for preventing (under certain circumstances) copying of digitally recorded audio material using commercially available DAT (digital audio tape) recorders. SCMS was devised jointly by the manufacturers of digital audio tape recorders and the providers of digital audio recorded program material, to limit copying of such material only in the digital domain. SCMS is described for instance in U.S. Pat. No. 5,144,658, incorporated by reference. In brief, SCMS adds a special control bit periodically to digital audio recorded program material which is to be copy protected (typically copyrighted material.) In a conventional digital audio playback device such as a CD player, which produces both an analog output signal and a digital output signal, the analog output signal is not copy protected, i.e. the control bit or analog equivalent does not appear therein. That is to say, the control bit is discarded internally by the digital to analog conversion process. Thus it is possible to make any number of generations of copies by connecting analog output from the CD player to an analog audio tape recorder.

However, the digital output signal from the CD player has the SCMS bit(s) set (to high) by the duplicator of the recorded audio material. A digital audio tape recorder receiving the digital output signal detects the SCMS bit(s) and if it determines for instance that one of these bit(s) in a particular location is high, the digital audio tape recorder will make a recording of the material (i.e. a digital recording) and in the process of making such recording (for instance) internally augments that one bit with a second bit in a second location. Thus it is possible later to playback this tape and have an acceptable analog output signal or an acceptable digital output signal. However, if an attempt is made later to rerecord the tape using another DAT recorder, the second DAT recorder seeks the location of both bits and if it detects the second bit will not make a copy thereof. Thus one is enabled to make serially one copy in the digital domain from a particular source recording. It is well understood that such a system can easily be extended to allow two, three or four or however many copies as is desired to be made serially; the intention is to limit the serial copies to some particular number, typically one in the case of SCMS.

The present inventor has determined that a similar serial copy limitation system is advantageous in the digital video field. In the case of the present invention, such a serial copy limitation system standard has not yet been defined but herein is generically described as a "Serial Copy Protection Scheme" (SCPS) embodied in SCPS bit detector 54. SCPS is conceptually similar to SCMS, but is in the video domain. SCPS bit detector 54 detects the serial copy protection scheme bit(s) if present in the digital video signal at terminal 14. If the first such SCPS bit for instance is detected, then an enabling signal is generated on line 58 which controls AC (anti-copy) bit adder 60 which adds (or sets to high) the second (actual anti-copy) bit at its predetermined location in the digital stream. Such SCPS bit(s) may be located for instance in the equivalent of the unused lines in the vertical blanking interval. The video signal then passes to switch 38 and then to digital tape deck 10 via switch 18. Such a digital signal thereby including the set (high) anti-copy bit is provided via terminal 20 on subsequent playback to digital video output terminal 42.

Providers of video material (such as commercial tape duplicators, broadcasters or cable TV systems) may choose to prevent any copying of their material (i.e. not use the SCPS). In this case, such providers would set (to high) the second (anti-copy) bit in their original material. Alternatively, where it is desired to completely prevent copying of material, an additional anti-copy bit location (independent of the SCPS bit) could be designated, and such an additional AC bit also detected by AC bit detectors 32,46, which in response would respectively prevent recording or provide the analog copy protection.

Alternatively, AC bit detector 46 could detect either of the SCPS bits and in response enable ACP signal generator 50 to copy protect the analog output signal at terminal 24.

Subsequent use of the output signal at digital video terminal 42 (for instance by recording the output signal using a second recorder of the type shown in FIG. 1) would prevent copying of this material by detection of the set AC bit by the AC bit detector 32 of the second recorder.

Therefore the digital video recording standard includes copy protection on a bit basis using particular assigned bits in a digital video stream. Such "SCPS" bit(s) and other anti-copy bit(s) are in one embodiment provided for instance in each video field or frame, for copy protection on a field-by-field or frame-by-frame basis.

Thus the apparatus of FIG. 1 accounts for all possibilities of both analog and digital copy prevention. That is to say, at the inputs side it is possible to detect the conventional analog copy protection signals for the various types of well known analog copy protection signals. At the inputs side provision is also made for a digital video copy protection system including serial copy limitation. On the outputs side, provision is made for copy protection on the output analog side of material played back which was digitally recorded. The circuit details of anti-copy detectors 32, 46, SCPS bit detector 54, and AC bit adder 60 depend on the nature of future digital video recording protocols (formats), but given knowledge of such format(s) these circuits may readily be made by one of ordinary skill in the art. Such protocols will be made known to both the manufacturers of digital video recorders and to the providers of digital video program material.

In another variant, ACP detector 26 rather than detecting the anti-copying signal as described in the above-referenced U.S. Pat. No. 4,907,093, instead reacts directly to the analog copy protection signal. This is accomplished for example by including an automatic gain control (AGC) circuit for reducing the level (amplitude) of the video signal so that the copy would be unacceptable for viewing. Most likely analog to digital converter 16 would of necessity include a AGC circuit, and this circuit could easily be designed to be especially vulnerable to the anti-copying protection signals which would effect the video levels.

It is also to be understood that the device of FIG. 1 need not be a record and playback device but could alternatively be a playback-only device, thus including only a digital playback tape deck 10 and the circuitry to the right thereof in FIG. 1, and not having the input circuitry to the left thereof. In this case the output circuitry is identical to that of the upper right portion and lower right portions of FIG. 1, reacting to an anti-copy bit present in the prerecorded digital material played back on tape deck 10. Also, in yet another version, an optical (digital) disk player is substituted for digital playback tape deck 10. Thus the upper right circuitry of the apparatus of FIG. 1 is applicable to playback-only devices for prevention of rerecording from the analog output terminal 24 of copy protected digital video material.

Another embodiment is for use with either digital or analog video material which for technical or other reasons is not copy protected in its original form and where upon playback a standard video (e.g., NTSC) signal is provided. An example is a so called "laser disc" which is used for distribution of prerecorded video material, by playback on a laser disc recorder. For technical reasons, the above described copy protection schemes of U.S. Pat. Nos. 4,631,603 and 4,914,694 are not compatible with laser discs, since inclusion of these copy protection schemes on laser discs causes playability problems.

Therefore a copy protection scheme is needed to prevent unauthorized recording of material played back from a laser disc. This is achieved by providing otherwise conventional laser disc players to be manufactured in accordance with the invention with additional circuitry including (1) an anti-copy (AC) flag detector; and (2) an ACP signal generator operationally connected to the anti-copy flag detector. Video material recorded on a laser disc is then provided with an anti-copy flag. The anti-copy flag typically is a signal of a particular level in a predetermined line of each VBI in the video material. (Analog, not digital video, is recorded on a laser disc.)

The anti-copy flag (corresponding to the anti-copy bit of FIG. 1) is detected by the anti-copy flag detector in the laser disc player, and in response the ACP signal generator modifies the analog signal output by the laser disc player in accordance with a conventional analog anti-copy process. This prevents use of a video tape recording made of the laser disc play analog output signal.

A similar modification may be made to the recently developed "WVHS" videotape recorders for recording high definition TV signals in the "Wide VHS" video format. WVHS is a video format, differing from standard (NTSC, PAL or SECAM) video. In this case, the modified WVHS videotape recorder senses the anti-copy flag in prerecorded material being played back on the WVHS videotape recorder, and in response modifies a played back standard video (i.e., NTSC) signal, using a conventional analog anti-copy process.

This embodiment is shown in FIG. 2 which is a block diagram of a playback-only device (such as a laser disc player) or a record and playback device (such as a WVHS VCR) adapted in accordance with the invention.

A playback-only device includes conventional playback mechanics/electronics 72, anticopy (AC) flag detector 74, and ACP signal generator 50. Detection of the AC flag in played-back standard (e.g., NTSC) video from mechanics/electronics 72 by detector 74 results in the "enable" signal on line 86 to ACP signal generator 50, so that the ACP signal on line 88 is then mixed into (or modifies) the NTSC video output at terminal 80. A second output signal on line 88 is another type of video, such as HDTV (high definition TV) or WVHS, for which a conventional anti-copy process is not suitable. Thus no ACP modification is made to the video on line 88.

For a record and playback device (such as a WVHS VCR), also included is input video terminal 84. If the incoming video at terminal 84 has the AC flag present, and the AC flag is still present after recording by mechanics and electronics 72, then the flag is detected by AC flag detector 74 on playback and this activates ACP signal generator 50 as before, to copy protect the played-back NTSC video at terminal 80. (Presence of the AC flag on play back depends on the particular format of the incoming video signal and the nature of mechanics/electronics 72.) Similarly, playback of prerecorded video material having the AC flag activates ACP signal generator 50.

The above description is illustrative and not limiting; further modifications will be apparent to one of ordinary skill in the art in light of this disclosure. It is to be understood that while at present consumer type digital video recording devices are not available, that digital video professional systems are now available, and the above-described apparatus and method are readily adaptable to such presently commercially available digital video recorders.

I claim:

1. An apparatus for playing back material digitally recorded on a recording medium, comprising:

a mechanism for playing the recording medium;

a digital output terminal operatively connected to the mechanism for providing a digital signal from the mechanism;

a digital to analog converter operatively connected to the mechanism for converting the digital signal to an analog signal;

an analog output terminal for providing an analog signal from the digital to analog converter;

a signal detector for detecting copy protection information present in the digital signal; and a signal generator for generating an analog copy protection signal in response to the detected copy protection information, and modifying the analog signal with the generated signal.

2. The apparatus of claim 1, wherein the digital signal and analog signals are video signals.

3. The apparatus of claim 2, wherein the copy protection information is at least one bit at a predetermined location in the digital signal.

4. The apparatus of claim 2, wherein the generated signal includes a pulse pair inserted into at least some blanking intervals of the analog video signal, each pulse pair including a positive going pulse and a negative going pulse.

5. The apparatus of claim 1, wherein the recording medium is magnetic tape.

6. The apparatus of claim 1, wherein the recording medium is an optical disk.

7. The apparatus of claim 2, wherein the generated signal includes pulses added to blanking intervals of the analog video signal.

8. The apparatus of claim 2, wherein the generated signal includes alterations of the time durations of horizontal line intervals in the analog video signal.

9. The apparatus of claim 2, wherein the generated signal includes alteration of the number of horizontal line intervals per video frame.

10. The apparatus of claim 3, wherein the one bit is in each field of the digital video signal.

11. The apparatus of claim 1, wherein the mechanism is also a recording mechanism, and further comprising:

a digital input terminal for receiving a digital input signal from an external source;

means for providing the digital input signal to the mechanism, for recording the digital input signal on the recording medium;

a second signal detector for detecting copy protection information present in the digital input signal;

means for inhibiting recording in response to detection of the copy protection information present in the digital input signal;

a third signal detector for detecting serial copy protection information present in the digital input signal; and a signal generator for generating a digital copy protection signal in response to the detected serial copy protection information and inserting the generated digital copy protection signal into the digital input signal.

12. The apparatus of claim 11, wherein the digital input signal is a video signal.

13. The apparatus of claim 12, further comprising a tuner for deriving the digital input signal from a modulated RF signal.

14. The apparatus of claim 11, further comprising:
an analog input terminal for receiving an analog input signal;
an analog to digital converter for converting the analog input signal to a converted digital signal;
means for providing the converted digital signal to the mechanism; and
an analog signal detector for detecting an analog copy protection signal present in the analog input signal and in response thereto inhibiting recording of the analog input signal.

15. The apparatus of claim 14, wherein both the means for providing are included in a switch for receiving the digital input signal and the converted digital signal and providing one or the other to the mechanism, depending on a connection established by the switch.

16. The apparatus of claim 14, wherein the signal detector includes an automatic gain control circuit responsive to the analog copy protection signal.

17. The apparatus of claim 14, wherein the signal detector includes a circuit responsive to the analog copy protection signal.

18. The apparatus of claim 14, wherein the analog signal detector includes means for detecting the analog copy protection signal and generating a recording inhibiting signal in response.

19. The apparatus of claim 11, wherein the second signal detector detects at least one bit in a predetermined location in the digital input signal.

20. An apparatus for playing back information recorded digitally on a recording medium, the digitally recorded information including copy protection portions, comprising:
a mechanism for playing the recording medium and providing a digital signal representing the recorded information;
a digital to analog converter for converting the digital signal to an analog signal; and
means for inserting a copy protection signal into the analog signal in response to detection of the copy protection portions.

21. A method for inhibiting copying of material digitally recorded on a recording medium, the material including copy protection information, comprising the steps of:
playing the material from the recording medium;
detecting the copy protection information in the played material;
converting the played material from a digital signal to an analog signal;
generating an analog copy protection signal in response to the detected copy protection information; and
modifying the analog signal with the generated analog copy protection signal.

22. The method of claim 21, wherein the digital signal and analog signals are video signals.

23. The method of claim 22, wherein the copy protection information is at least one bit at a predetermined location in the digital signal.

24. The method of claim 22, wherein the generated signal includes a pulse pair inserted into at least some blanking intervals of the analog video signal, each pulse pair including a positive going pulse and a negative going pulse.

25. The method of claim 21, wherein the recording medium is magnetic tape.

26. The method of claim 21, wherein the recording medium is an optical disk.

27. The method of claim 22, wherein the generated signal includes alterations of the time durations of horizontal line intervals in the analog video signal.

28. The method of claim 21, wherein the generated signal includes alteration of the number of horizontal line intervals per video frame.

29. The method of claim 23, wherein the one bit is located in each field of the digital video signal.

30. The method of claim 22, further comprising:
receiving a digital input signal from an external source;
recording the digital input signal on the recording medium;
detecting copy protection information present in the digital input signal;
inhibiting recording in response to detection of the copy protection information present in the digital input signal;
detecting serial copy protection information present in the digital input signal;
generating a digital copy protection signal in response to the detected serial copy protection information; and
inserting the digital copy protection signal into the digital input signal.

31. The method of claim 30, wherein the digital input signal is a video signal.

32. The method of claim 31, further comprising deriving the digital input signal from an RF signal.

33. The method of claim 30, further comprising:
receiving an analog input signal;
converting the analog input signal to a converted digital signal; and
detecting an analog copy protection signal present in the analog input signal and in response inhibiting recording of the analog input signal.

34. The method of claim 22, further comprising:
providing a switch for receiving the digital input signal and the converted digital signal; and
recording one or the other signal depending on a connection established by the switch.

35. The method of claim 33, wherein the analog signal detecting includes providing an automatic gain control circuit directly responsive to the analog copy protection signal.

36. The method of claim 33, wherein the analog signal detecting includes providing a circuit directly responsive to the analog copy protection signal.

37. The method of claim 33, wherein the analog signal detecting includes:
detecting the analog copy protection signal; and
generating a recording inhibiting signal in response.

38. The method of claim 30, wherein the serial copy protection information comprises at least one bit in a predetermined location in the digital input signal.

39. The method of claim 30, further comprising the steps of inhibiting recording in response to the detected serial copy protection information.

40. A method of inhibiting copying of digital recorded material, the material including digital copy protection portions, comprising the steps of:
providing from a recording a digital signal representing the recorded material;
detecting the copy protection portions in the digital signal;
converting the digital signal to an analog signal; and
modifying the analog signal with an analog copy protection signal in response to the detection of the copy protection portions.

41. A method of copy-protecting a video signal formed of a stream of digital data bits, the method using a serial copy protection bit detector, comprising:
setting a first serial copy protection bit to a predetermined value, the first serial copy protection bit occurring at a predesignated location in the stream;
determining the value of the first serial copy protection bit upon receipt of the video signal at the serial copy protection bit detector;
setting a second serial copy protection bit to a predetermined value upon determination that the value of the first serial copy protection bit is the predetermined value, wherein the second serial copy protection bit is in a location in the stream associated with the first serial copy protection bit;
detecting the second serial copy protection bit; and
upon detection of the second serial copy protection bit, inhibiting recording of the video signal.

42. The method of claim 41, further comprising setting a plurality of first and second serial copy protection bits occurring periodically in the stream.

43. A digital video recorder comprising:
a digital video recording mechanism;
an input terminal for receiving a digital video signal;
a first signal detector for detecting copy protection information present in the digital video signal;
means for inhibiting recording of the digital video signal in response to detection of the copy protection information;
a second signal detector for detecting serial copy protection information present in the digital video signal; and
a signal generator for generating a digital copy protection signal in response to the detected serial copy protection information and inserting the generated digital copy protection signal into the digital signal.

44. The apparatus of claim 43, wherein the first signal detector detects at least one bit at a predetermined location in the digital video signal, and wherein the second signal detector detects at least one bit in a location associated with the location of the first bit.

45. An apparatus for playing back video material recorded on a recording medium, comprising:
a mechanism for playing the recording medium and providing an analog video playback signal;
a detector for detecting a copy protection flag in the played back signal; and
a signal generator for generating an anti-copy signal in response to the detected copy protection flag and modifying the analog video playback signal with the generated signal.

46. The apparatus of claim 45, wherein the copy protection flag is a predetermined signal level in a blanking interval of the analog video playback signal.

47. The apparatus of claim 45, wherein the mechanism is also for recording an input analog video signal, and the copy protection flag is a predetermined signal level in a blanking interval of the input analog video signal.

48. A method of copy protecting recorded video material, comprising:
providing a flag at a predetermined location in a recorded video signal to be copy protected;
playing back the recorded video material as an analog video signal;
detecting the flag in the played back analog video signal; and
upon detecting the flag, modifying the played back analog video signal with a copy protection process.

49. A method of copy protecting analog video material to be recorded comprising:
providing a flag at a predetermined location in the analog video signal to be recorded;
receiving the analog video signal;
recording the analog video signal;
detecting the flag in the recorded video signal upon playing back of the recorded video signal; and
in response to detection of the flag, modifying the video signal with an analog copy protection process.

* * * * *